United States Patent [19]
Coleman et al.

[11] Patent Number: 5,853,112
[45] Date of Patent: Dec. 29, 1998

[54] CANDY HOLDER AND CANDY FEEDING DEVICE

[76] Inventors: Thomas J. Coleman, 19170 Paddock Pl., Abingdon, Va. 24211; William K. Schlotter, IV, 117 Wateredge La., Fredericksburg, Va. 22406; Princess Ann Coleman, 19170 Paddock Pl., Abingdon, Va. 24211; Ann M. Schlotter, 117 Wateredge La., Fredericksburg, Va. 22406

[21] Appl. No.: 807,801

[22] Filed: Feb. 28, 1997

[51] Int. Cl.$^6$ ....................................................... B65B 1/00
[52] U.S. Cl. ........................... 222/371; 222/415; 221/253
[58] Field of Search ................................... 222/371, 415; 221/253

[56] References Cited

U.S. PATENT DOCUMENTS

| | | | |
|---|---|---|---|
| 2,362,315 | 11/1944 | Schultze | 222/415 |
| 2,491,177 | 12/1949 | Harber | 222/415 |
| 2,983,325 | 5/1961 | Moody, Sr. | 222/415 |
| 3,463,362 | 8/1969 | Garber | 222/371 |
| 3,523,562 | 8/1970 | Haupricht | 222/415 |
| 4,060,111 | 11/1977 | Burks | 222/415 |
| 4,417,802 | 11/1983 | Forbes, II | 222/415 |
| 4,462,743 | 7/1984 | Romberg | 222/415 |
| 4,850,304 | 7/1989 | Nicholson | 222/415 |
| 4,922,463 | 5/1990 | Del Zotto et al. | 222/415 |
| 5,007,561 | 4/1991 | Wahl et al. | 222/371 |

*Primary Examiner*—J. Casimer Jacyna
*Attorney, Agent, or Firm*—Melvin L. Crane

[57] ABSTRACT

A candy holding and retrieving device which moves a powdered candy or any suitable candy from a reservoir onto a plastic or rubber belt which delivers the candy to a user. The device includes a main housing which contains a motor, a power supply, a gearing system designed for the proper torque and speed, and a plastic or rubber belt. The belt can be made with the surface bumpy or have a scoop made into or attached to the belt for collecting hard candy or gum and depositing it out at an opening in the main housing. The upper end of the main housing has a wheel which turns on an axle and which engages the gearing system. The lower end of the main housing has another wheel that turns on an axle. The plastic or rubber belt encircles both wheels on the outside of the main housing. A spaced plastic covering on the outside of the main housing encloses the plastic or rubber belt, and is provided with a contact switch for operating the motor. The wheel at the lower end of the main housing is enclosed with a transparent plastic container which holds the powdered candy and has an opening for refilling the container.

6 Claims, 4 Drawing Sheets

CANDY HOLDER AND CANDY FEEDING DEVICE

This invention is directed a candy holder and candy feeding device for feeding small pieces of candy or a powdered candy from a reservoir to a user.

BACKGROUND OF THE INVENTION

Applicants do not know of any directly related prior art but have knowledge of the following patents which in some respects operate similar to the candy holder and feeding device. These patents are U.S. Pat. Nos. 1,604,294; 2,244,528; 2,618,376; and 2,658,602. The prior art patents make use of a belt for lifting some type of material from a container and dispensing the material at an upper end of the belt for use by the operator.

OBJECTS AND ADVANTAGES OF THE INVENTION

This invention has an object of lifting candy from a reservoir to an upper end of a belt for dispensing the candy for consumption or use by an operator.

Another object is to provide a device which can be operated by a small child without injury to the child.

Yet another object is to provide a candy lifting device which lifts a powdered candy or small pieces of a hard candy, small pieces of gum, or any other suitable pieces of material.

Another object is to provide a candy lifting device which prevents the candy from falling from a lifting belt.

Still another object is to provide a motor driven belt which is provided with small lifting scoops on the belt to lift powdered candy or other types of product so that the belt scoops will collect some of the powdered candy or other product which is lifted to the top of the belt and dispensed for consumption by the operator.

Yet another object is to make use of a motor driven belt which is provided with scoops or risers on the belt which will collect the candy, gum or other product on the risers or scoops in order to raise the candy, gum or product from a reservoir to an upper end of the belt for dispensing the product for consumption by the operator.

Other objects and advantages will become obvious from a better understanding of the invention from a review of the drawings and detailed description.

DETAILED DESCRIPTION OF THE INVENTION

Figure 1:
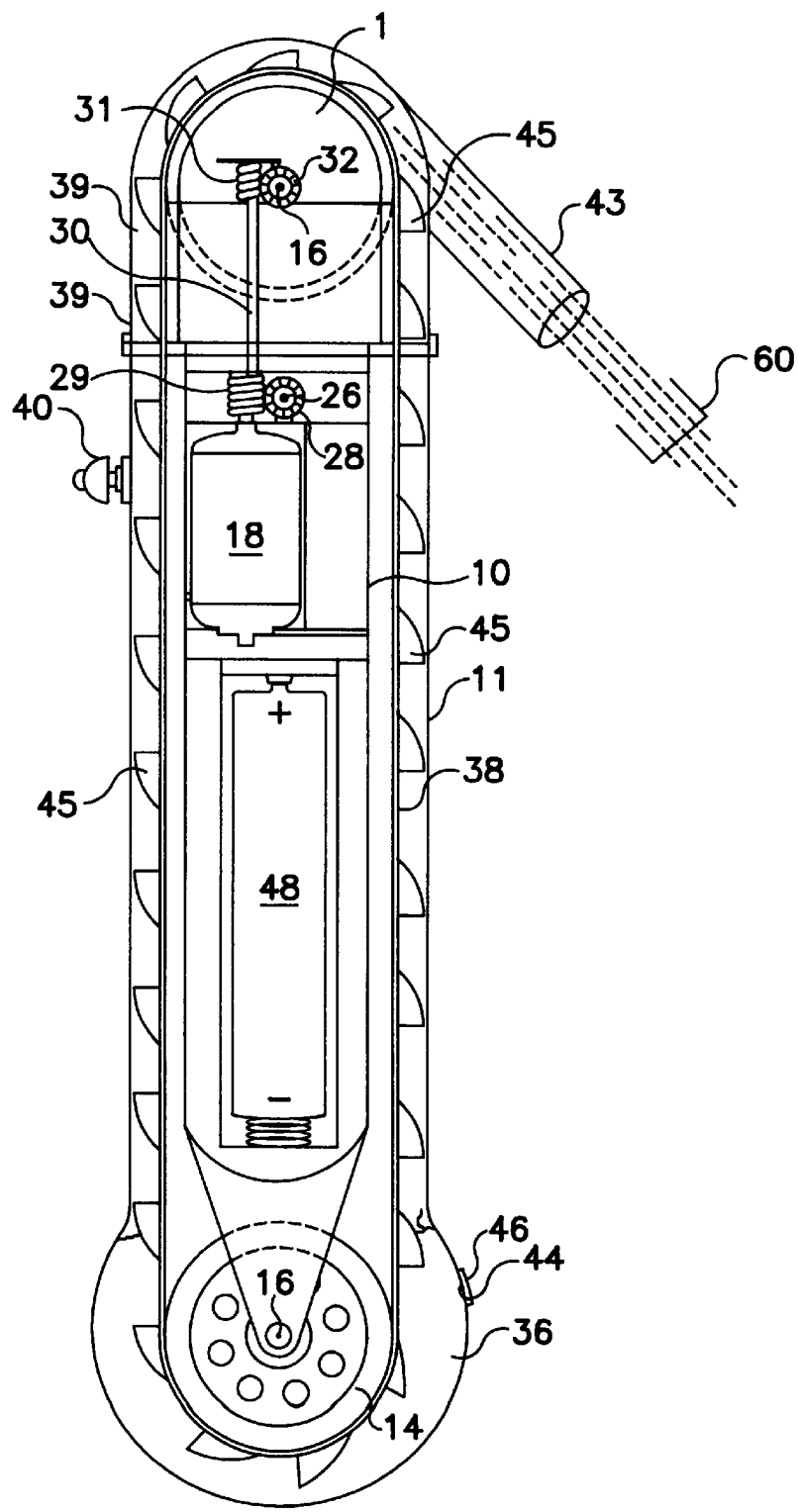
FIG. 1 illustrates one side view illustrating the drive motor, battery and other parts within a plastic protection covering and dispenser.

Now, referring to the drawings wherein each like reference character refers to the same part throughout the drawings, there is shown in FIG. 1 a side view of the product holder, product dispensing device. As shown, the device includes a housing 10 which can be made of clear plastic as shown or any other suitable material. Each end of the device includes a rotatable wheel 12, 14 which rotates on an axle 16 secured to the housing. The housing of FIG. 1 has been shown with a clear plastic covering 11 such that one can see a drive motor 18 which drives a drive gear 20 hidden behind gear 24 on a drive shaft which drives a drive gear 24 on a second drive shaft 26 that has a driven gear 28 on one end. The driven gear 28 drives a gear 29 on one end of a shaft 30 which includes a gear 31 on the upper end that drives a gear 32 that drives the upper wheel 12. The lower wheel 14 is rotatable on the shaft 16. The lower wheel is positioned so that the wheel rotates relative to a reservoir 36 assembled at the bottom of the housing. A rubber or plastic belt 38 encircles the upper and lower wheels and the wheels are of such a diameter that the belt passes on opposite sides of the housing. The lower wheel is assembled such that a portion of the belt on the lower wheel passes through the reservoir 36 so that scoops 45 will pick up the product contained in the reservoir. A switch 40 is operated to activate the motor which will rotate the wheels by the gearing assembly.

FIG. 1 further shows a plastic covering 11 which encloses at least the belt portion that carries the product from the reservoir to the top of the housing. The plastic covering protects the product as it is being lifted to the top of the housing. As shown, the plastic covering encloses the bottom wheel, forms the reservoir 36, and extends upwardly to enclose the housing up to about three-fourths of the length of the housing. An upper end cap 39 fits onto the upper end of covering 38 and includes thereon a candy dispensing spout 43 through which the candy is dispensed from each of the scoops 45 as the belt is rotated. The dispensing spout 43 can be covered by an end covering 60 as shown in FIG. 1. As noted in FIG. 1, the scoop about to pass the inlet to the dispenser helps to guide the powdery candy from the scoop just above that drops the powdery candy into the inlet of the dispenser. The operator then catches the candy in their hand or permits the candy to drop into their mouth or some other means of catching the falling candy.

Figure 2:
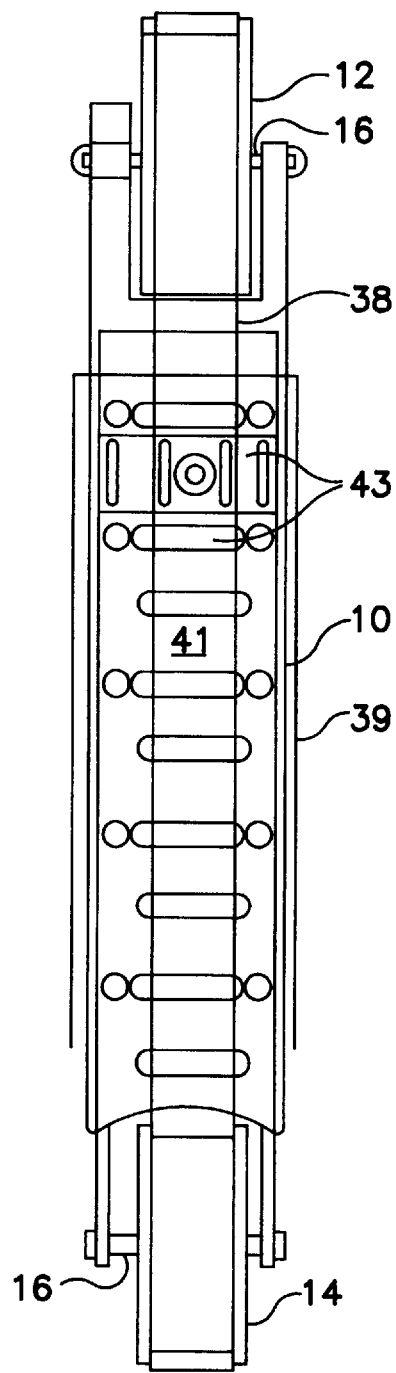
FIG. 2 illustrates a front view which illustrates the housing with a drive belt and wheels upon which the belt rotates.

FIG. 2 illustrates a front view of the device shown without the reservoir or the upper end spout. The front 41 of the housing 10 is shown with different designs 43 which can be any desired picture, symbols, etc. The belt 38 is shown on the outside of the housing and is shown extending around the upper and lower wheels 12, 14. The belt is shown with loops which represent the scoops 45. The reservoir shown in FIG. 1 could have an opening 44 through which the product could be added to the reservoir. The opening 44 would then have a closure 46 to prevent any of the product from escaping from the reservoir. One or more batteries 48 can be used to supply power to operate the motor.

Figure 3:
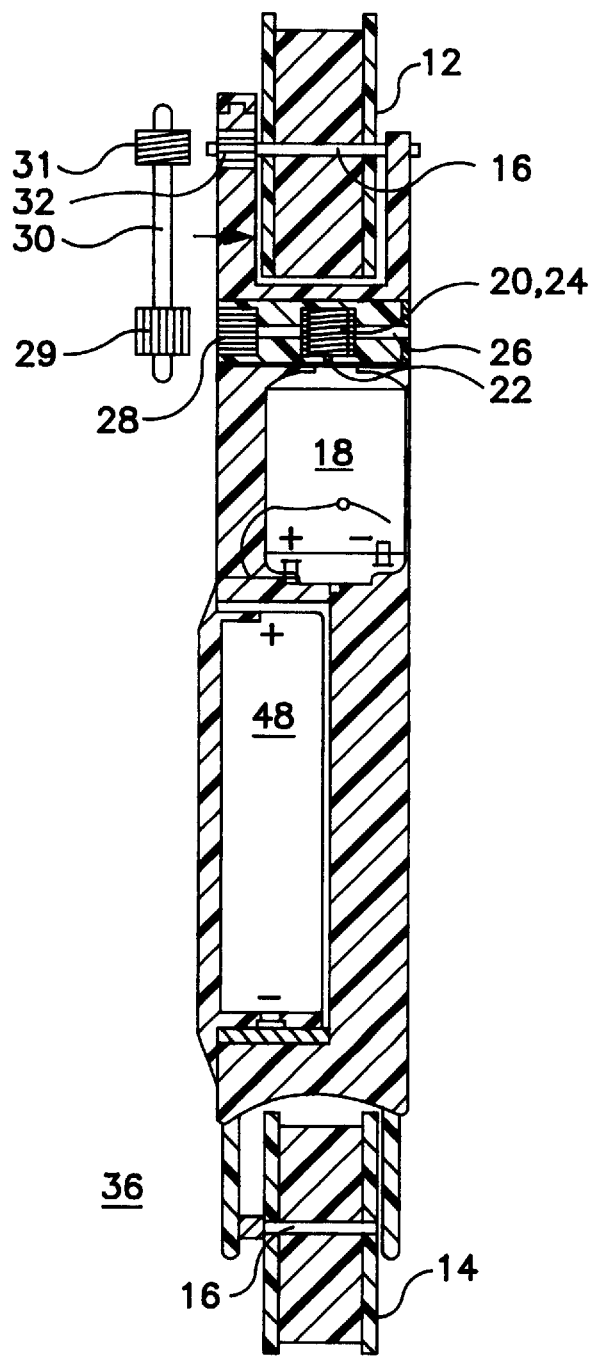
FIG. 3 illustrates a cross-sectional view which illustrates the relative operative parts.

FIG. 3 is a cross-sectional view which illustrates the relative parts. FIG. 3 more clearly illustrates the gear assembly by which the motor drives the upper wheel. The gear assembly includes the motor shaft 22, gears 20, 24, shaft 26, gears 28, 29, shaft 30, and gears 31, 32. These all cooperate in order to rotate the upper wheel which in turn rotates the lower wheel by use of the belt. The gears 29, 31 and the drive shaft 30 are shown separated from the housing for clarity. It is obvious that the gears 29, 31 and shaft 30 will be assembled in the housing in order to operate the upper wheel and the belt.

Figure 5:
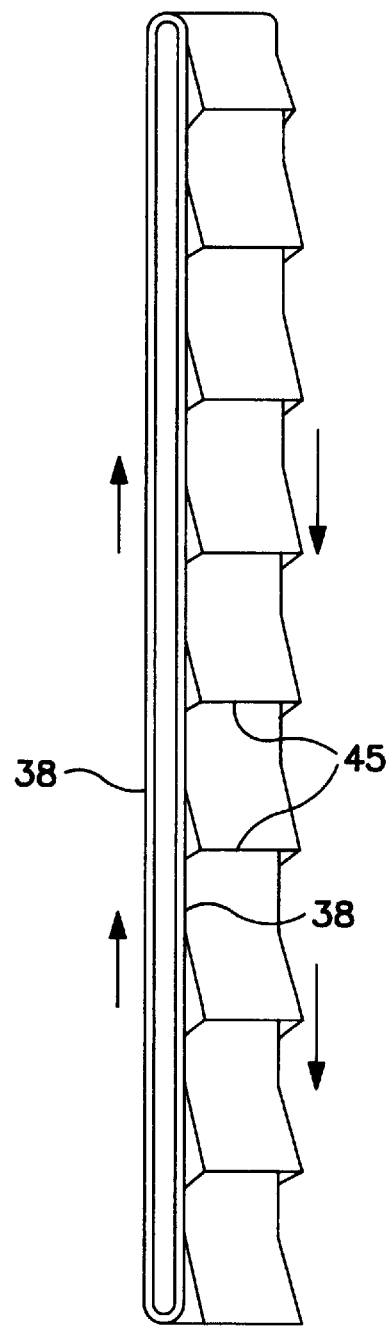
FIG. 5 illustrates a belt for lifting a product from a reservoir.

FIG. 5 illustrates the belt 38. The belt 38 can be made with a smooth inner and outer surface which can be used for picking up a powder type of product. The belt can be provided with spaced parallel ridges or scoops 45 which can pick up powder product on small pieces of product such as candy or gum that could be picked up.

Figure 4:
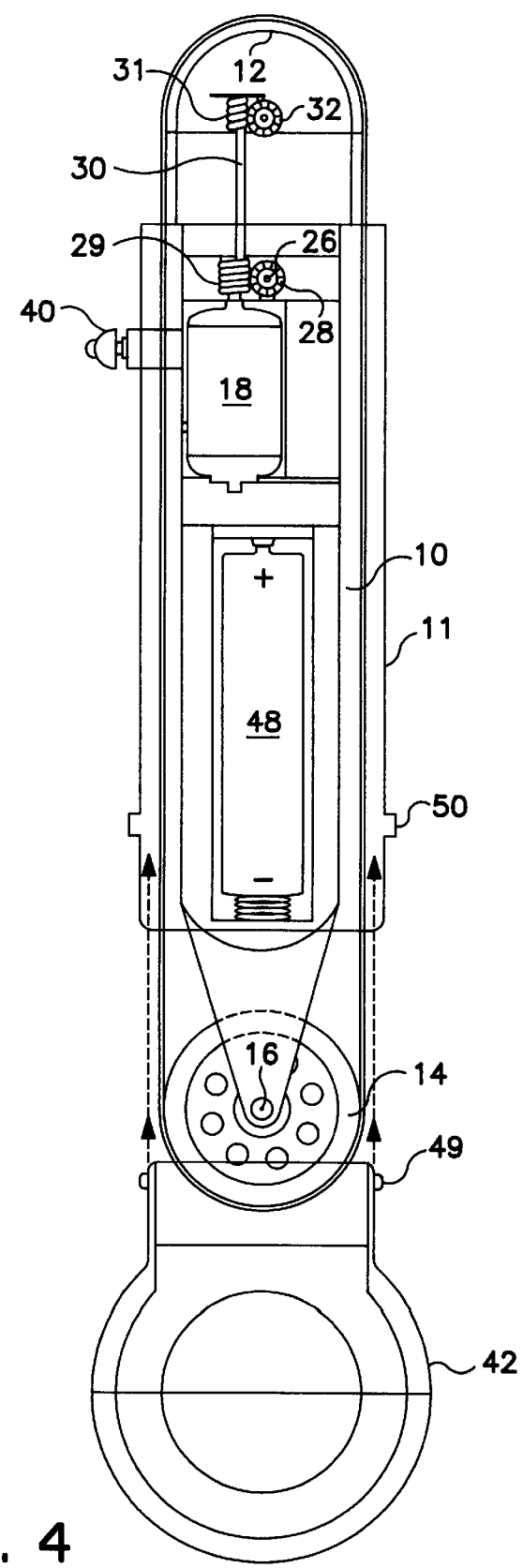
FIG. 4 illustrates a removable reservoir fill cap.

The reservoir can be made so that the reservoir is secured to and removable from the lower end of the covering 11. As shown in the drawings, FIG. 4, the upper end of the reservoir is provided with at least two oppositely disposed projections 49. The upper end of the reservoir has a diameter which is slightly less than the diameter of the covering so that the upper end of the reservoir can slip into the bottom end of the covering. The bottom end of the covering includes indentations 50 which are compatible with the projections 48 on the reservoir so that the projections on the reservoir will slip into the indentations on the covering in order to secure the reservoir in place. Since the reservoir is detachable from the covering a filler opening could be dispensed with.

The device could be operated without the upper end piece 39 and the dispensing spout as follows: the product is placed within the reservoir. The switch is closed to complete an electrical circuit with the battery and motor. The motor rotates the gears which in turn rotate the upper wheel. The upper wheel drives the belt which surrounds the upper and lower wheels. The belt passes through a portion of the reservoir to collect some of the product on the belt. The product is brought to the upper end of the housing and the switch is opened to break the operative circuit to the motor. The product can then be removed from the belt. The switch can be placed beside the belt so that the switch can be closed to start the motor and the belt, and after the belt has been rotated through one revolution on the wheels, the belt is provided with means that opens the switch. Thus, the rotation of the belt will be stopped automatically after one complete rotation of the belt. A belt is provided with spaced parallel ridges or scoops or other outer extending lifting means 48 so that powder or pieces of a product can be picked up from the reservoir and carried to the top of the housing where it is dispensed through the shoot. A portion of the belt and lower wheel is enclosed in the reservoir. Since the reservoir is a part of or removably secured to the lower end of the covering any product that falls from the scoops will fall back into the reservoir. Therefore, the candy will be retained within the covering and carried to the upper end or dropped back into the reservoir.

The foregoing relates to preferred exemplary embodiments of the invention, it being understood that other variants and embodiments thereof are possible within the spirit and scope of the invention, the latter being defined by the appended claims.

What is claimed is:

1. A motorized product dispensing device which comprises:

a support housing having a linear axis, said support housing including a first wheel supported on and rotatable with a first axle, a second wheel supported on a second axle for rotation on said second axle, said first and second axles being supported in said support housing and axially spaced from each other, a gearing system for rotating said first wheel, a motor for driving said gearing system, a power source for energizing the motor, said gearing system, said motor, and said power source being supported by said support housing, at least one switch in an electrical line from said power source to said motor for controlling electrical energy to operate said motor, a belt that encircles said first and second wheels for rotation with said wheels, said belt including means extending therefrom for lifting a product as said belt is rotated by said first and second wheels which are driven by said motor and gearing system, an outer enclosure which surrounds and encloses said support housing, said wheels, said belt, said gearing system, said motor, and said power source, said outer enclosure extends axially along the support housing and includes a reservoir for containing a product to be lifted axially by said belt, and a dispensing spout at one end of said outer enclosure for dispensing products lifted from said reservoir.

2. A motorized product dispensing device as set forth in claim 1, in which said enclosure includes an opening through which a product to be lifted can be added to the reservoir, and a covering for the opening in said enclosure.

3. A motorized product dispensing device as set forth in claim 2, in which, said dispensing spout includes a covering for covering an end of the dispensing spout when the device is not in use to prevent any contaminants from entering the enclosure.

4. A motorized product dispensing device as set forth in claim 3, in which, said reservoir includes an upper end extension, and said upper end extension includes oppositely disposed projections on an outer surface that locks within oppositely disposed indentations on an inner surface of a lower end of said covering.

5. A motorized product dispensing device as set forth in claim 1, in which, said dispensing spout includes a covering for covering an end of the dispensing spout when the device is not in use to prevent any contaminants from entering the housing.

6. A motorized product dispensing device as set forth in claim 1, in which, said gearing system includes a first drive gear which is driven by a motor shaft, a first driven gear which is driven by said first drive gear, a first drive shaft to which said first driven gear is secured, a second drive gear secured on one end of said first drive shaft, a second drive shaft, a second driven gear secured to a first end of said second drive shaft, a third driven gear secured to a second end of said second drive shaft, a fourth driven gear secured to said first axle and driven by said third driven gear for rotating said first axle and said first wheel, whereby said belt is driven by said gearing system and said first wheel.

* * * * *